US012780630B2

(12) United States Patent
Yoshida

(10) Patent No.: US 12,780,630 B2
(45) Date of Patent: Nov. 3, 2026

(54) TRANSPORT VEHICLE AND RECORDING MEDIUM

(71) Applicant: Mitsubishi Logisnext Co., Ltd., Kyoto (JP)

(72) Inventor: Tetsuro Yoshida, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 195 days.

(21) Appl. No.: 18/450,382

(22) Filed: Aug. 15, 2023

(65) Prior Publication Data

US 2024/0327182 A1 Oct. 3, 2024

(30) Foreign Application Priority Data

Mar. 29, 2023 (JP) ................................ 2023-052777

(51) Int. Cl.
*B66F 9/075* (2006.01)
*B66F 9/06* (2006.01)

(52) U.S. Cl.
CPC ............ *B66F 9/0755* (2013.01); *B66F 9/063* (2013.01)

(58) Field of Classification Search
CPC .......... B66F 9/0755; B66F 9/063; B66F 9/24; B66F 9/07504; B66F 9/07581
See application file for complete search history.

(56) References Cited

U.S. PATENT DOCUMENTS

| | | | | |
|---|---|---|---|---|
| 10,850,961 | B2 * | 12/2020 | Tanaka | G01B 11/002 |
| 2017/0285644 | A1 * | 10/2017 | Ichinose | B66F 9/063 |
| 2018/0120465 | A1 * | 5/2018 | Rose | B66F 9/063 |
| 2020/0377350 | A1 * | 12/2020 | Nonogaki | B66F 9/063 |
| 2021/0041564 | A1 | 2/2021 | Hattori | |
| 2022/0289538 | A1 * | 9/2022 | Kawashima | G01S 17/89 |
| 2022/0363528 | A1 * | 11/2022 | Okamoto | B66F 9/0759 |

(Continued)

FOREIGN PATENT DOCUMENTS

| | | | |
|---|---|---|---|
| JP | 2020030642 | 2/2020 | |
| JP | 2021143039 | 9/2021 | |
| JP | 2022034408 A * | 3/2022 | G05D 1/242 |

(Continued)

OTHER PUBLICATIONS

Machine Translation: KR-20200012298-A (Year: 2020).*

(Continued)

*Primary Examiner* — Anne Marie Antonucci
*Assistant Examiner* — Connor L Knight
(74) *Attorney, Agent, or Firm* — JCIPRNET

(57) ABSTRACT

A transport vehicle capable of side-shifting a cargo loading unit while referring to the positional relationship of cargo with respect to the cargo loading unit is provided. The transport vehicle 1 includes: forks 16; a side shift unit 19 that side-shifts the forks 16; a point group acquisition unit 22 that acquires a point group by horizontally irradiating cargo loaded on the forks 16 with a laser; an edge specifying unit that specifies a position of an edge of the cargo based on the acquired point group; a cargo position specifying unit; and a side shift controller that controls a side shift amount of the side shift unit 19. The cargo position specifying unit detects whether the positional relationship of the cargo with respect to the forks 16 changes based on the specified position of the edge of the cargo when the forks 16 are side-shifted.

12 Claims, 12 Drawing Sheets

(56) References Cited

U.S. PATENT DOCUMENTS

| | | | | |
|---|---|---|---|---|
| 2023/0083322 | A1 * | 3/2023 | Isogawa | B66F 9/24<br>702/6 |
| 2023/0227298 | A1 * | 7/2023 | Kakita | B66F 9/0755<br>187/224 |

FOREIGN PATENT DOCUMENTS

| | | | | |
|---|---|---|---|---|
| JP | 2022125781 | | | 8/2022 |
| JP | 2022125781 | A | * | 8/2022 |
| JP | 2022157138 | A | * | 10/2022 |
| KR | 20200012298 | A | * | 2/2020 |

OTHER PUBLICATIONS

Machine Translation: JP-2022157138-A (Year: 2022).*
Machine Translation: JP-2022125781-A (Year: 2022).*
Machine Translation: JP-2022034408-A (Year: 2022).*
"Search Report of Europe Counterpart Application", issued on Mar. 15, 2024, pp. 1-7.

* cited by examiner

TRANSPORT VEHICLE AND RECORDING MEDIUM

CROSS-REFERENCE TO RELATED APPLICATION

This application claims the priority benefits of Japanese application no. 2023-052777, filed on Mar. 29, 2023. The entirety of the above-mentioned patent application is hereby incorporated by reference herein and made a part of this specification.

BACKGROUND

Technical Field

The disclosure relates to a transport vehicle for transporting cargo and a cargo handling program.

Description of Related Art

Conventionally, there is an unmanned guided vehicle that autonomously travels and handles cargo, as shown in Patent Literature 1 (Japanese Patent Application Laid-Open No. 2020-030642). The unmanned guided vehicle disclosed in Patent Literature 1 includes forks, an elevating device for raising and lowering the forks, and a laser scanner for detecting the position of the vehicle itself. The unmanned guided vehicle is configured to move to a predetermined cargo handling position while detecting its own position and raise and lower the forks to perform cargo handling work. Further, the unmanned guided vehicle disclosed in Patent Literature 2 (Japanese Patent Application Laid-Open No. 2021-143039) includes a side shift unit, and the backrest and the forks are moved in the left-right direction by the side shift unit.

When loading cargo, there are times when cargo has to be loaded in a narrow space. At such times, the landing point of the cargo can be adjusted by side shift by the side shift unit before loading the cargo. For a manned guided vehicle, it is possible to visually recognize that the cargo has come into contact with a surrounding object, but in the case of an unmanned guided vehicle, there is a problem that the contact cannot be detected.

SUMMARY

The disclosure provides a transport vehicle that is capable of side-shifting a cargo loading unit while referring to the positional relationship of the cargo with respect to the cargo loading unit.

A transport vehicle according to the disclosure includes: a cargo loading unit; a side shift unit that side-shifts the cargo loading unit; a point group acquisition unit that acquires a point group by horizontally irradiating cargo loaded on the cargo loading unit with a laser; an edge specifying unit that specifies a position of an edge of the cargo based on the acquired point group; a cargo position specifying unit; and a side shift controller that controls a side shift amount of the side shift unit. The cargo position specifying unit detects whether a positional relationship of the cargo with respect to the cargo loading unit changes based on the specified position of the edge of the cargo when the cargo loading unit is side-shifted.

The transport vehicle preferably further includes: a side shift stop unit, and the side shift stop unit stops an operation of the side shift unit in a case of detecting that the positional relationship of the cargo with respect to the cargo loading unit changes when the cargo loading unit is side-shifted.

In the transport vehicle, preferably, the side shift controller side-shifts the cargo loading unit by the side shift unit until detecting that positional relationship of the cargo with respect to the cargo loading unit changes during cargo loading.

The transport vehicle preferably further includes: a distance calculation unit. The point group acquisition unit is arranged at a position to be capable of irradiating an object adjacent to a cargo loading position with a laser, the edge specifying unit further specifies an edge of the object based on the acquired point group, the distance calculation unit calculates a distance in a left-right direction between the cargo and the object based on the specified positions of the edges of the cargo and the object, and the side shift controller determines the side shift amount based on the calculated distance in the left-right direction between the cargo and the object.

In the transport vehicle, preferably, the edge specifying unit analyzes the acquired point group using a frequency distribution with the distance in the left-right direction as an axis, and specifies a section with frequencies, adjacent to an area with substantially no frequency, as the position of the edge of the cargo in the left-right direction. It should be noted that "substantially no frequency" in the disclosure means to exclude a case where an empty area has frequencies due to noise or the like. The edge specifying unit may delete frequencies due to noise or the like, or may ignore low frequencies for analysis using a known technique.

In the transport vehicle, preferably, the edge specifying unit analyzes the acquired point group using a frequency distribution with a distance in a front-rear direction as an axis, and specifies a section of a peak value in an upper area as the edge of the object and specifies a section of a peak value in a lower area as the position of the edge of the cargo.

In the transport vehicle, preferably, the side shift controller side-shifts the cargo loading unit from the object in a direction of the cargo loading position when there is no distance in the left-right direction between the cargo and the object.

In the transport vehicle, preferably, the point group acquisition unit is arranged at a position to be capable of irradiating the cargo loaded on the cargo loading unit and a cargo loading position with a laser.

The transport vehicle is, for example, a forklift and includes a backrest, and the point group acquisition unit is provided in the backrest.

A cargo handling program according to the disclosure causes a computer to operate as the edge specifying unit, the cargo position specifying unit, and the side shift controller.

The transport vehicle according to the disclosure is capable of side-shifting the cargo loading unit while referring to the positional relationship of the cargo with respect to the cargo loading unit.

BRIEF DESCRIPTION OF THE DRAWINGS

FIG. 3A to FIG. 3C show the connecting part, wherein FIG. 3A is a perspective view seen from the front top, FIG. 3B is a plan view, and FIG. 3C is a front view.

DESCRIPTION OF THE EMBODIMENTS

Figure 1:
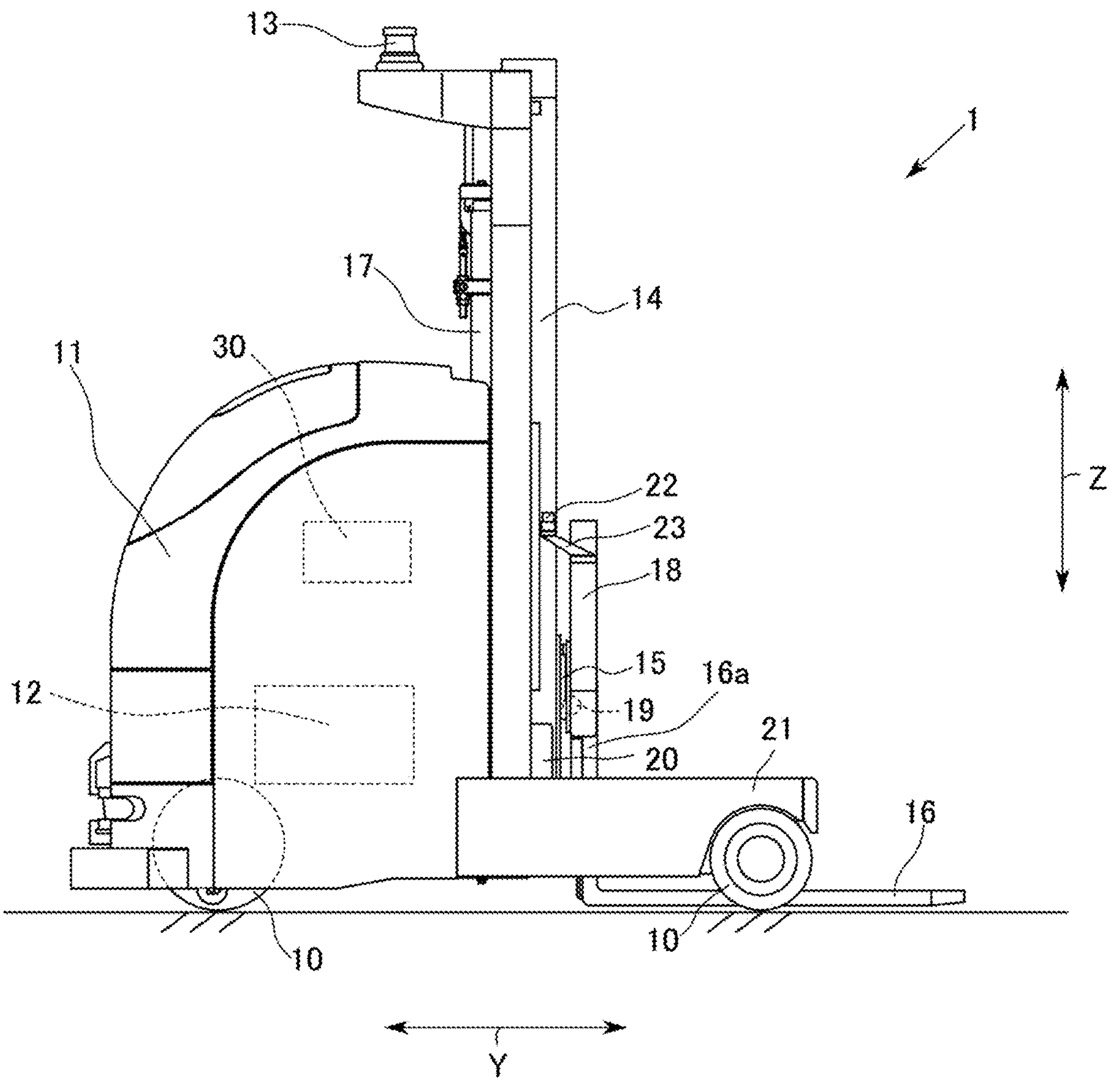
FIG. 1 is a side view of the cargo handling vehicle according to an embodiment of the disclosure.

Hereinafter, an embodiment of a transport vehicle and a cargo handling program according to the disclosure will be described with reference to the accompanying drawings. In the drawings, a double-headed arrow X indicates the left-right direction, a double-headed arrow Y indicates the front-rear direction, and a double-headed arrow Z indicates the up-down direction.

Figure 2:
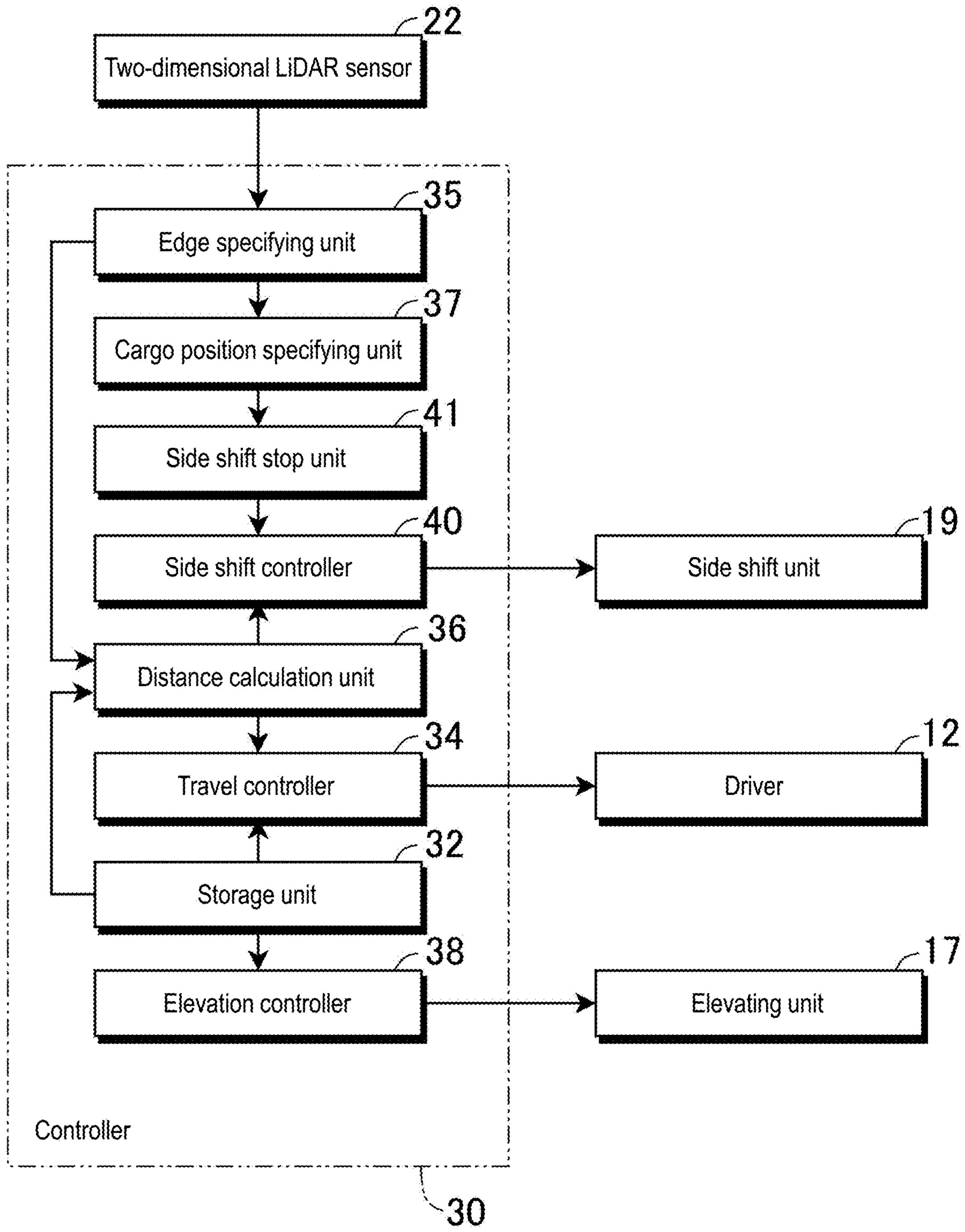
FIG. 2 is a functional block diagram of the controller.
Figure 3A:
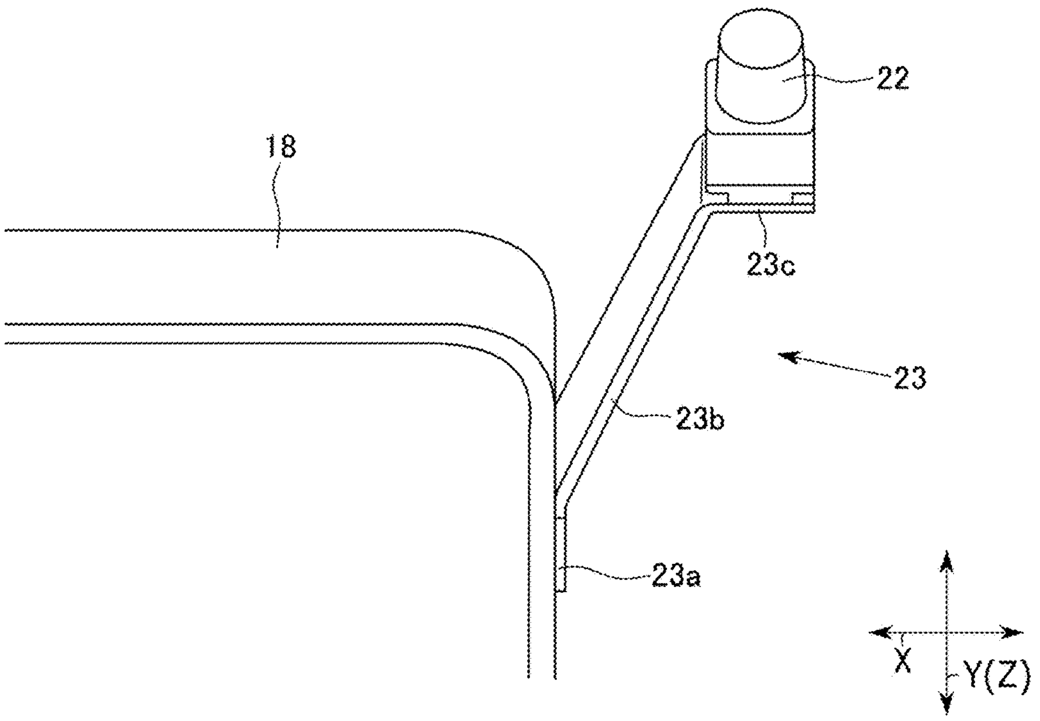
Figure 3B:
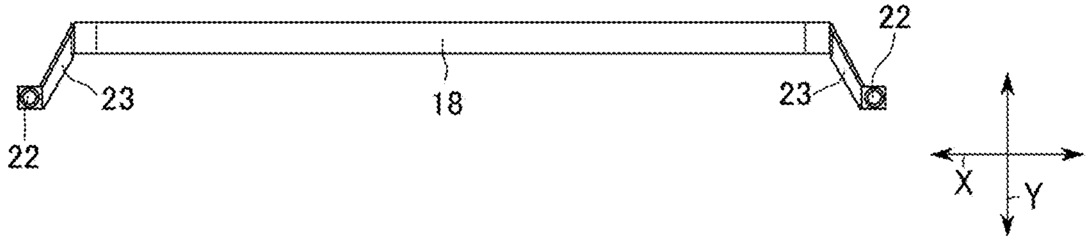
Figure 3C:
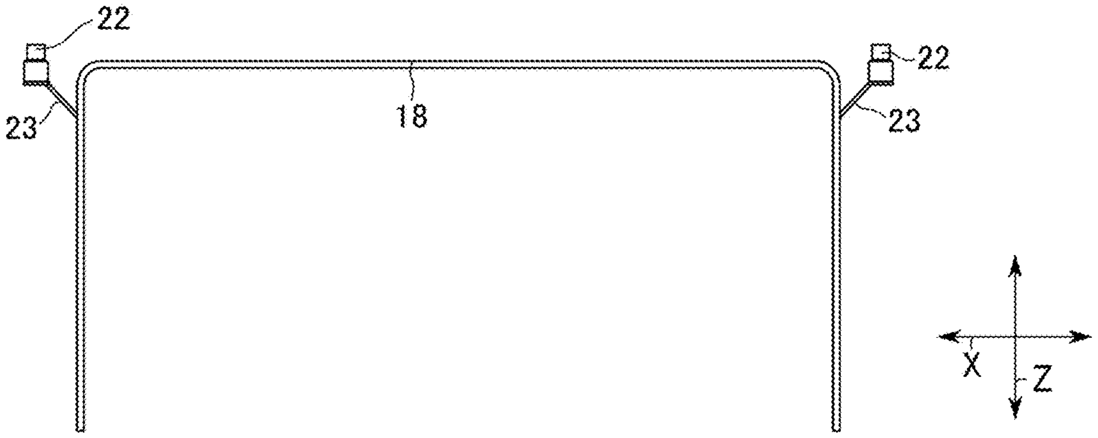

FIG. 1 is a side view of the transport vehicle 1 according to this embodiment, and FIG. 2 is a functional block diagram of a controller 30. The transport vehicle 1 according to this embodiment is an unmanned guided vehicle that autonomously travels and handles cargo, but this is merely an example, and the transport vehicle 1 according to the disclosure is not limited thereto. For example, the transport vehicle 1 may be a manned/unmanned transport vehicle 1.

As shown in FIG. 1 and FIG. 2, the transport vehicle 1 includes a plurality of wheels 10, a vehicle body 11, a driver 12, a laser scanner 13, left and right masts 14, a lift bracket 15, left and right forks 16, an elevating unit 17, a backrest 18, a side shift unit 19, left and right carriages 20, left and right reach legs 21, left and right two-dimensional LiDAR sensors 22, left and right connecting parts 23, and the controller 30. Although the transport vehicle 1 is a reach-type forklift, this is merely an example, and the transport vehicle 1 according to the disclosure may be a counter-type forklift.

The vehicle body 11 is arranged on the wheels 10, and the driver 12 is arranged inside the vehicle body 11. The driver 12 is configured to rotate and stop the wheels 10.

The laser scanner 13 is arranged above the vehicle body 11, and rotates horizontally to emit a laser. Then, the laser scanner 13 specifies the position of a reflector arranged in the facility by scanning the reflected light of the laser, so as to specify the current position of the transport vehicle 1.

The left and right masts 14 extend vertically and are arranged in front of the vehicle body 11. The lift bracket 15 has finger bars for fixing the left and right forks 16, and is configured to be raised and lowered along the left and right masts 14 by the elevating unit 17. The left and right forks 16 correspond to the "cargo loading unit" of the disclosure. In this embodiment, the number of forks 16 is four, but may be two or six and is not particularly limited. The transport vehicle 1 is equipped with four forks 16, so as to scoop up two pallets (cargo) at the same time.

The backrest 18 is formed in the shape of a frame, and is configured to extend vertically and horizontally and receive the loaded cargo W1. For the backrest 18 shown in FIG. 3A to FIG. 3C and FIG. 5, only the outer frame is shown, and the outer frame is arranged outside the forks 16 in the left-right direction.

The side shift unit 19 has an actuator, and is configured to move the backrest 18 together with the forks 16 in the left-right direction by the actuator. Thus, the side shift unit 19 is capable of adjusting the position of the fork 16 in the left-right direction with respect to the fork insertion hole of the pallet and adjusting the position for loading the cargo W1. The actuator may be a hydraulic actuator or an electric actuator, and is not particularly limited.

The left and right carriages 20 are provided outside the left and right masts 14 respectively, and the left and right reach legs 21 extend forward from the vehicle body 11. Guides for guiding the carriages 20 are provided inside the left and right reach legs 21, and the mast 14 is moved together with the carriage 20 to an advanced position or a retracted position by a reach cylinder (not shown).

The left and right two-dimensional LiDAR sensors 22 are configured by laser scanners, and are configured to be capable of irradiating a laser while rotating in the horizontal direction and scanning the reflected light of the laser to acquire the distances to the surrounding objects of the two-dimensional LiDAR sensors 22 by a point group PG. The two-dimensional LiDAR sensor 22 corresponds to the "point group acquisition unit" of the disclosure. For example, instead of the two-dimensional LiDAR sensor 22, the point group acquisition unit may be a three-dimensional LiDAR sensor or a three-dimensional ToF (Time of Flight) camera, and is not limited to a two-dimensional LiDAR sensor.

As shown in FIG. 1 and FIG. 3A to FIG. 3C, the left and right connecting parts 23 have first end portions 23*a*, intermediate portions 23*b*, and second end portions 23*c*.

The first end portions 23*a* are fixed to the left and right ends of the backrest 18, and the intermediate portion 23*b* extends obliquely behind the backrest 18 from the first end portion 23*a* in plan view. The second end portion 23*c* has a horizontal surface continuous from the intermediate portion 23*b*, and supports the two-dimensional LiDAR sensor 22 with the horizontal surface.

The length of the intermediate portion 23*b* is configured such that the two-dimensional LiDAR sensor 22 supported by the second end portion 23*c* is positioned outside the side surface of the cargo loaded on the forks 16. That is, if the width of the backrest 18 is narrow and the cargo protrudes greatly from the backrest 18 to the left and right, the length of the intermediate portion 23*b* is lengthened accordingly.

Figure 4:
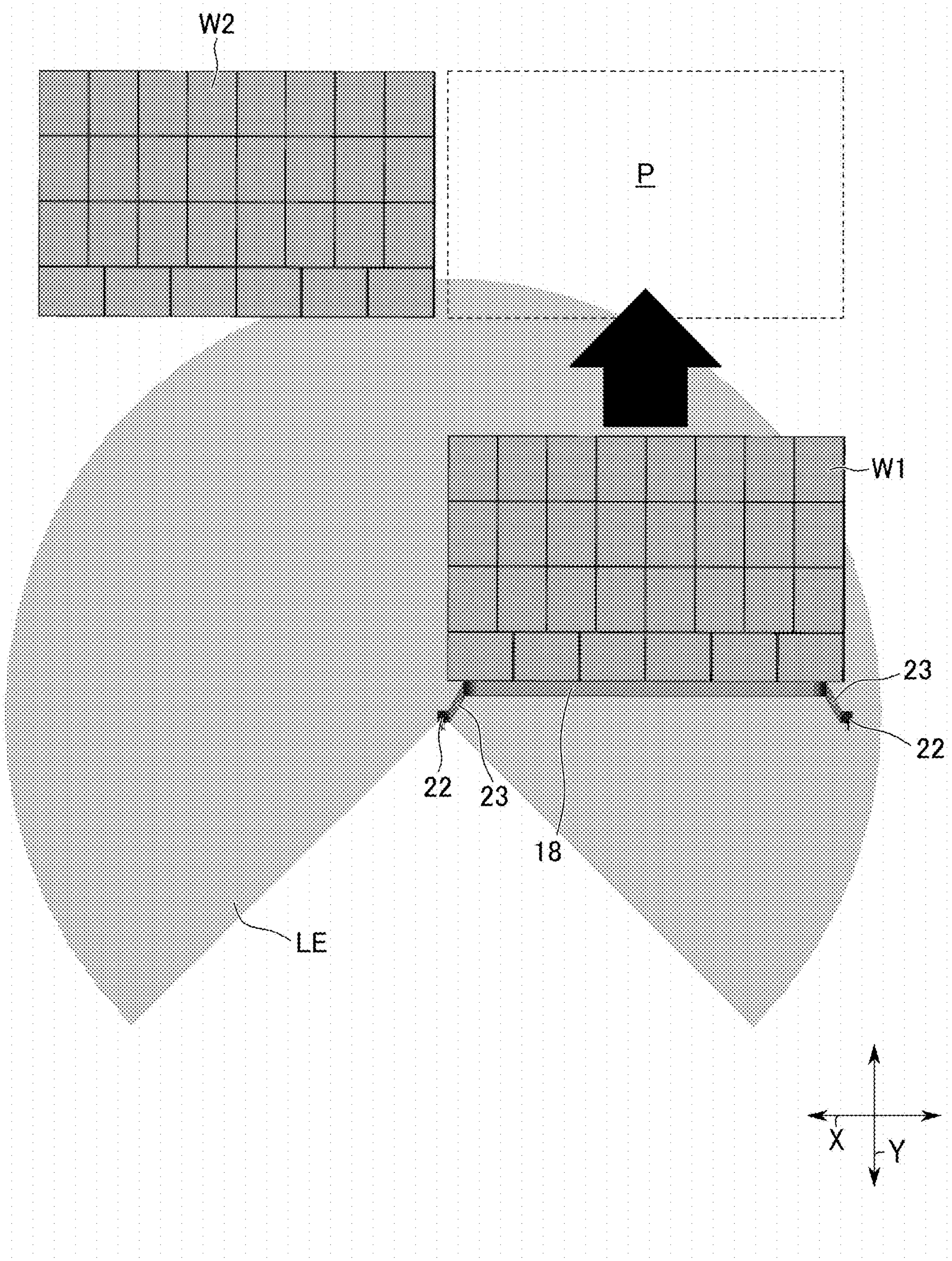
FIG. 4 is a plan view showing laser irradiation of the two-dimensional LiDAR sensor.
Figure 5:
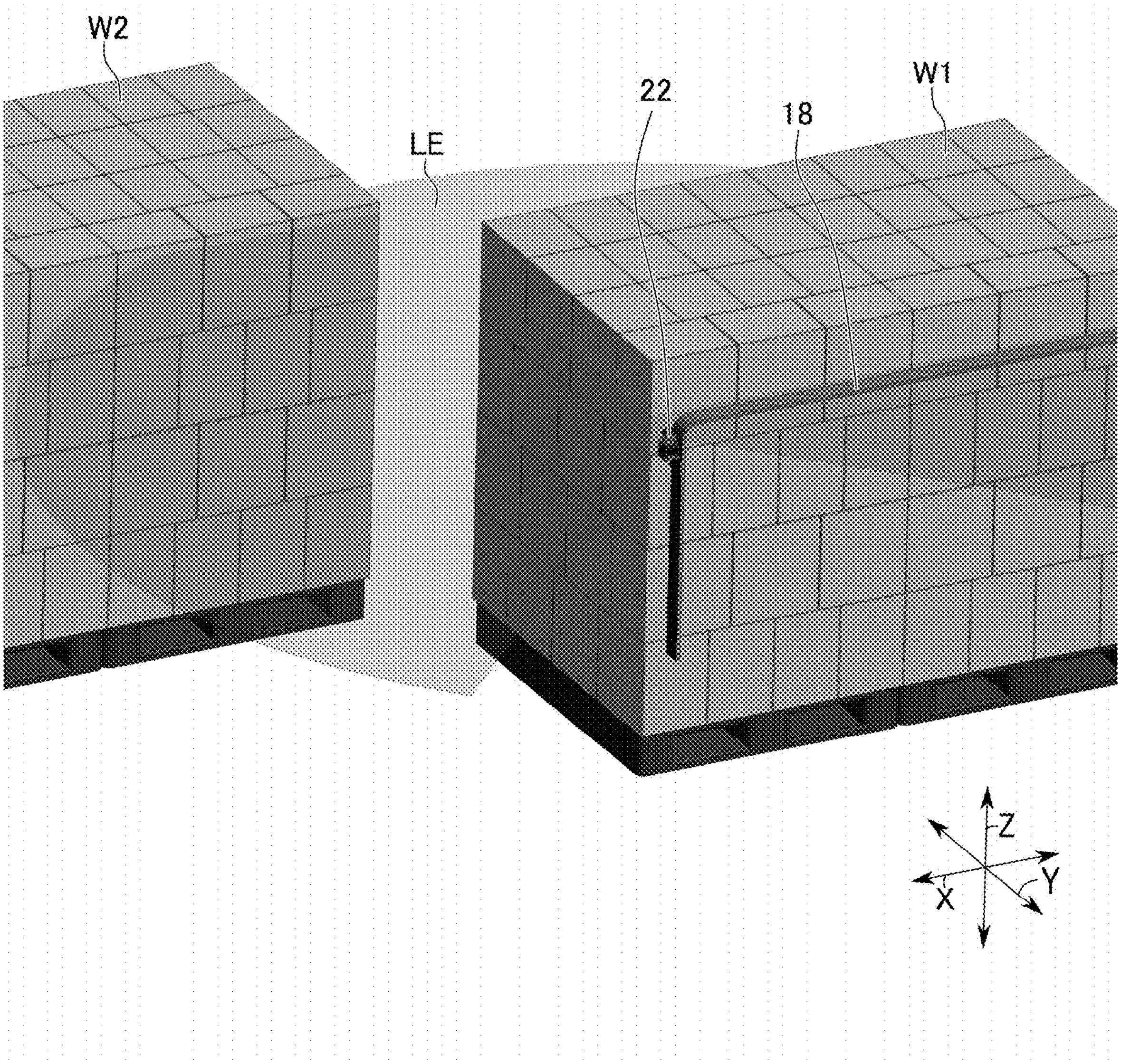
FIG. 5 is a perspective view showing laser irradiation of the two-dimensional LiDAR sensor.

FIG. 4 is a plan view showing a laser irradiation range LE of the two-dimensional LiDAR sensor 22, and FIG. 5 is a perspective view showing the laser irradiation range LE of the two-dimensional LiDAR sensor 22. Further, FIG. 4 and FIG. 5 show the cargo W1 loaded on the forks 16 and the cargo W2 loaded adjacent to a cargo loading position P in front of the cargo W1. The cargo loading position P is, for example, a predetermined loading position of a mobile shelf included in a cargo handling schedule, a predetermined loading position of a loading platform of a truck T, or the like.

As shown in FIG. 4 and FIG. 5, the two-dimensional LiDAR sensor 22 is arranged at a position to be capable of horizontally irradiating the cargo W1 loaded on the forks 16 and the cargo loading position P with a laser. Then, the two-dimensional LiDAR sensor 22 acquires the distance to the object for each irradiation angle by irradiating the laser while rotating horizontally and receiving the reflected light. This distance data is acquired as the point group PG.

Figure 6A:
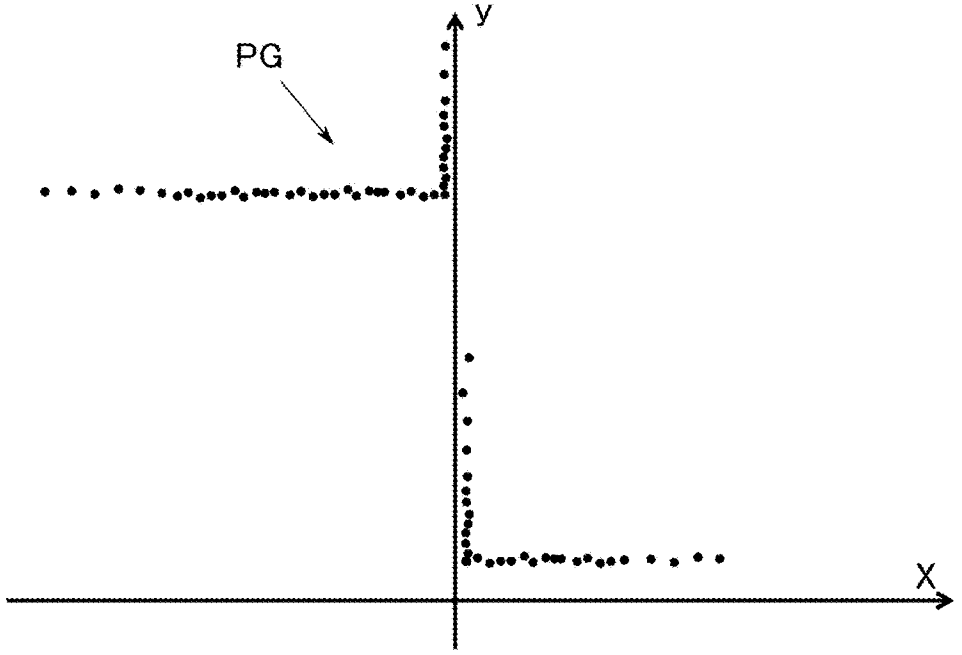
FIG. 6A is a diagram showing the point group acquired by the two-dimensional LiDAR sensor on the left side.

FIG. 6A is a diagram showing the point group PG acquired by the two-dimensional LiDAR sensor 22 on the left side. The X-axis in FIG. 6A and FIG. 6B indicates the distance in the left-right direction and the Y-axis in FIG. 6A and FIG. 6C indicates the distance in the front-rear direction, and the intersection (origin) of the X-axis and the Y-axis indicates the position of the two-dimensional LiDAR sensor 22. In addition, the point group PG in the attached drawings is an image diagram for showing an example of the acquired point group PG, and is not the point group PG actually acquired. As shown in FIG. 6A, the point group PG is acquired along the end surfaces of the cargo W1 loaded on the forks 16 and the cargo W2 loaded adjacent to the cargo loading position P.

As shown in FIG. 1, the controller 30 is arranged inside the vehicle body 11. The controller 30 is configured by a computer having a storage device, an arithmetic unit, and a memory. The storage device stores a cargo handling program that causes the computer to operate as an edge specifying unit 35, a cargo position specifying unit 37, and a side shift controller 40 described below.

As shown in FIG. 2, the controller 30 includes a storage unit 32, a travel controller 34, the edge specifying unit 35, a distance calculation unit 36, the cargo position specifying unit 37, an elevation controller 38, the side shift controller 40, and a side shift stop unit 41.

A cargo handling schedule is stored in the storage unit 32, and the cargo loading position P is included in the cargo handling schedule. The storage unit 32 also includes the positions of the left and right two-dimensional LiDAR sensors 22 and the distance from the retracted position to the advanced position of the mast 14.

The travel controller 34 is configured to control the driver 12, and causes the transport vehicle 1 to travel to the cargo loading position P with reference to the cargo loading position P stored in the storage unit 32 and the current position acquired by the laser scanner 13.

As will be described later, the edge specifying unit 35 analyzes the acquired point group PG using a frequency distribution with distances in the front-rear and left-right directions respectively as the X-axis and the Y-axis, to specify a section with frequencies adjacent to an area with substantially no frequency as the positions of edges in the left-right and front-rear directions of the cargo W1 or a surrounding object (for example, cargo W2). As described above, "substantially no frequency" in the disclosure means to exclude a case where an empty area has frequencies due to noise or the like. The edge specifying unit 35 may delete frequencies due to noise or the like, or may ignore low frequencies for analysis using a known technique. Hereinafter, the description of "substantially no frequency" is omitted to the description of "no frequency."

As will be described later, the distance calculation unit 36 calculates the distances in the left-right and front-rear directions between the cargo W1 and the object based on the positions of the edges in the left-right and front-rear directions of the cargo W1 and the object (for example, cargo W2) specified by the edge specifying unit 35.

The travel controller 34 may calculate a forward distance required for unloading based on the distance D2 in the front-rear direction between the cargo W1 and the cargo W2 calculated by the distance calculation unit 36, and the distance from the retracted position to the advanced position of the mast 14, and cause the transport vehicle 1 to advance based on the calculated distance.

The cargo position specifying unit 37 specifies the positions of the edges in the left-right and front-rear directions of the cargo W1 (W3) specified by the edge specifying unit 35 as either the left or right side surface position and front surface position of the cargo W1 (W3).

In addition, the cargo position specifying unit 37 calculates the position of the center of the cargo W1 (W3) in the left-right direction based on the specified left and right side surface positions of the cargo W1 (W3).

Furthermore, when the forks 16 are side-shifted by the side shift unit 19, the cargo position specifying unit 37 detects a change in the positional relationship between the two-dimensional LiDAR sensor 22 and the cargo W1 based on the specified positions of the edges of the cargo W1. Further, the cargo position specifying unit 37 detects a change in the positional relationship between the two-dimensional LiDAR sensor 22 and the cargo W1 (W3) when the forks 16 are pulled out from the cargo W1 (W3). Since the positional relationship between the two-dimensional LiDAR sensor 22 and the forks 16 is fixed, as a result, the cargo position specifying unit 37 detects whether the positional relationship of the cargo W1 with respect to the forks 16 (cargo loading unit) changes.

The elevation controller 38 is configured to control the elevating unit 17, and raises and lowers the forks 16 by the elevating unit 17 based on the cargo loading position P stored in the storage unit 32.

The side shift controller 40 is configured to control a side shift amount of the side shift unit 19. Then, the side shift controller 40 determines the side shift amount of the side shift unit 19 based on the distance D1 in the left-right direction between the cargo W1 and the object adjacent to the cargo loading position P, which is specified by the distance calculation unit 36.

Thereby, the side shift controller 40 moves the cargo W1 close to or away from the object adjacent to the cargo loading position P. As a result, the side shift controller 40 is capable of loading the cargo W1 with a closed space between the cargo W1 and the cargo W2 and avoiding a state where the cargo W1 overlaps.

As will be described later, if it is desired to press the cargo W1 against the object when loading the cargo, the side shift controller 40 may side-shift the cargo loading unit by the side shift unit 19 until the cargo position specifying unit 37 detects a change in the positional relationship between the two-dimensional LiDAR sensor 22 and the cargo W1.

The side shift stop unit 41 stops the operation of the side shift unit 19 if the cargo position specifying unit 37 detects a change in the positional relationship between the two-dimensional LiDAR sensor 22 and the cargo W1 when the forks 16 are side-shifting. When the cargo W1 contacts the object (for example, cargo W2) adjacent to the cargo loading position P, the movement of the forks 16 in the left-right direction caused by the side shift unit 19 is stopped, so it is possible for the transport vehicle 1 to prevent damaging the front panel, etc. of the truck T, for example.

<Edge Position Specifying Method and Distance Calculation Method>

Figure 6C:
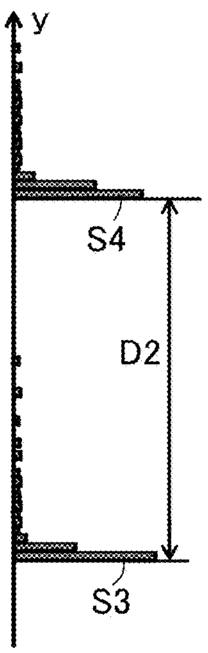
FIG. 6C is a diagram in which the point group of FIG. 6A is displayed as a histogram in the front-rear direction.
Figure 6B:
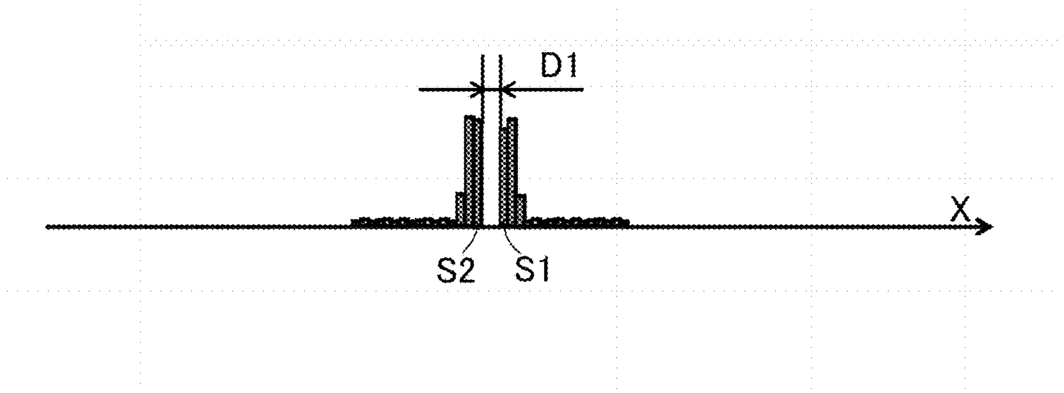
FIG. 6B is a diagram in which the point group of FIG. 6A is displayed as a histogram in the left-right direction.

Next, the method by which the edge specifying unit 35 specifies the positions of the edges of the cargo W1 and the object, and the method by which the distance calculation unit 36 calculates the distance D1 in the left-right direction between the cargo W1 and the cargo W2 will be described again with reference to FIG. 6A to FIG. 6C. FIG. 6B and FIG. 6C show the point group PG of FIG. 6A as histograms in the left-right direction and the up-down direction. This description is based on the point group PG acquired by the two-dimensional LiDAR sensor 22 on the left side. Therefore, when the edge position specifying method and the distance calculation method according to the disclosure are performed based on the point group PG acquired by the two-dimensional LiDAR sensor 22 on the right side, the left and right are reversed.

As shown in FIG. 6B, according to the frequency distribution on the X-axis, there is an area with no frequency in the middle. This area indicates areas where reflection of the laser received by the two-dimensional LiDAR sensor 22 is extremely low or unavailable compared to other areas.

The edge specifying unit 35 specifies a right section S1 with frequencies, adjacent to the area with no frequency, as the position (coordinates in the left-right direction) of the edge on the left side of the cargo W1. Further, the edge specifying unit 35 specifies a left section S2 with frequencies, adjacent to the area with no frequency, as the position (coordinates in the left-right direction) of the edge on the right side of the cargo W2.

In addition, as shown in FIG. 6C, according to the frequency distribution on the Y-axis, there are an area with no frequency that is closest to the origin and an area with no frequency that is second closest to the origin. These areas also indicate areas where reflection of the laser received by the two-dimensional LiDAR sensor 22 is extremely low or unavailable compared to other areas.

The edge specifying unit 35 specifies a section S3 with frequencies, which is adjacent to the upper side of the area with no frequency that is closest to the origin, as the position (coordinates in the up-down direction) of the edge on the front surface side of the cargo W1 as viewed from the transport vehicle 1. Further, the edge specifying unit 35 specifies an upper section S4, which is adjacent to the area with no frequency that is second closest to origin, as the position (coordinates in the up-down direction) of the edge on the front surface side of the cargo W2.

Since each of the sections S1, S2, S3, and S4 has a range of numerical values, the position of each edge may be the average value of the numerical values in each section, or may be the minimum value or the maximum value in the section S1.

The distance calculation unit 36 calculates the distance D1 of the gap between the specified position of the edge of the cargo W1 and the specified position of the edge of the cargo W2 in the left-right direction, that is, the distance D1 between the coordinates of the edges in the left-right direction. Next, the distance calculation unit 36 calculates the distance D2 of the gap between the specified position of the edge of the cargo W1 and the specified position of the edge of the cargo W2 in the up-down direction, that is, the distance D2 between the coordinates of the edges in the up-down direction.

As shown in FIG. 6C, according to the frequency distribution on the Y-axis, there are peak values respectively in the upper section group and the lower section group that sandwich the second area with no frequency. Thus, the edge specifying unit 35 may specify the lower section, among the sections of the two peak values, as the position (coordinates in the up-down direction) of the edge on the front surface side of the cargo W1 as viewed from the transport vehicle 1.

Further, the edge specifying unit 35 may specify the upper section, among the sections of the two peak values, as the position (coordinates in the up-down direction) of the edge on the front surface side of the cargo W2.

In this way, the transport vehicle 1 is able to analyze the point group PG acquired by the two-dimensional LiDAR sensor 22 using the frequency distribution to specify the position of each edge of the cargo W1 and the object adjacent to the cargo loading position P, and further calculate the distance D1 in the left-right direction and the distance D2 in the front-rear direction between the cargo W1 and the object adjacent to the cargo loading position P.

Since the transport vehicle 1 is capable of correcting the cargo loading position P afterward even if the mobile shelf, the truck T, or the like deviates from the predetermined position, it is possible to load the cargo W1 at an appropriate position. The histograms of FIG. 6B and FIG. 6C are for illustrating the frequency distribution in this specification, and there is no particular need for the edge specifying unit 35 to create histograms.

FIG. 7A to FIG. 10C show examples of the information that the transport vehicle 1 can acquire by frequency distribution analysis.

Figure 7A:
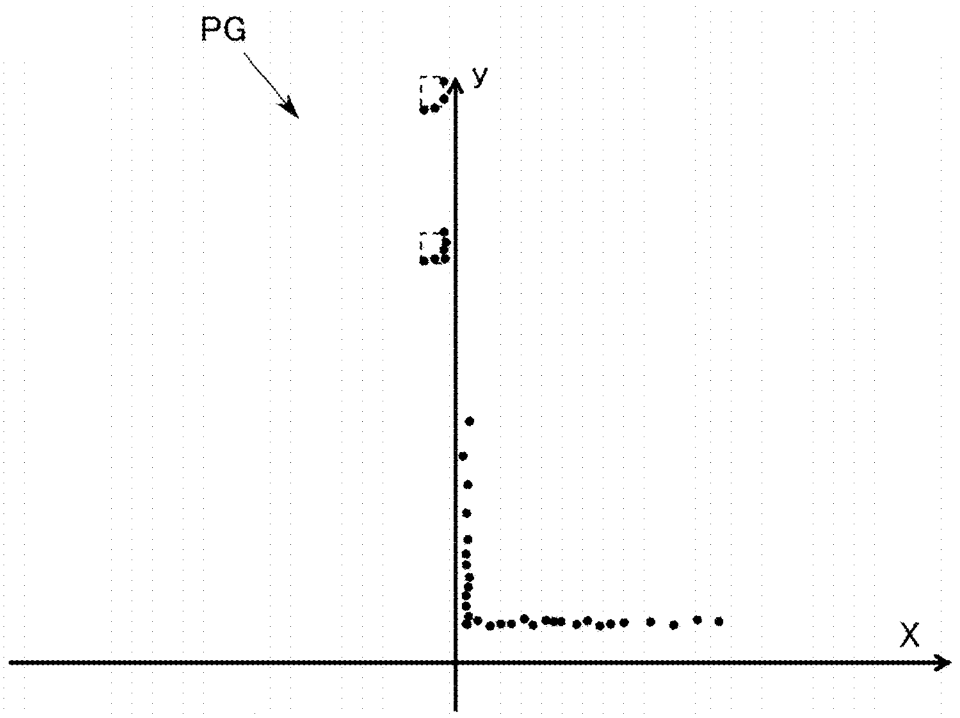
FIG. 7A is a diagram showing another point group acquired by the two-dimensional LiDAR sensor on the left side.
Figure 7C:
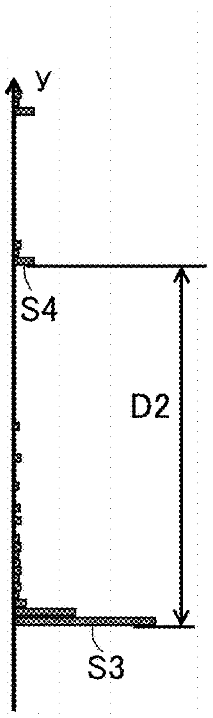
FIG. 7C is a diagram in which the point group of FIG. 7A is displayed as a histogram in the front-rear direction.
Figure 7B:
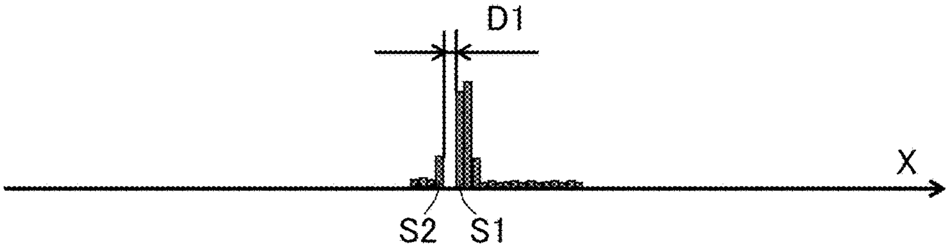
FIG. 7B is a diagram in which the point group of FIG. 7A is displayed as a histogram in the left-right direction.

FIG. 7A shows the point group PG acquired by the two-dimensional LiDAR sensor 22 when the cargo loading position P is a frame-shaped rack. The left side of FIG. 7A shows two point groups PG acquired by irradiating two frames with a laser. In addition, FIG. 7B and FIG. 7C show the acquired point groups PG by histograms in the left-right direction and the up-down direction.

The edge specifying unit 35 specifies the right section S1 with frequencies, adjacent to the area with no frequency, as the position (coordinates in the left-right direction) of the edge on the left side of the cargo W1 by the same method as described above. Further, the edge specifying unit 35 specifies the left section S2 with frequencies, adjacent to the area with no frequency, as the position (coordinates in the left-right direction) of the edge on the right side of the frame.

Furthermore, the edge specifying unit 35 specifies the upper section S3 with frequencies, which is adjacent to the area with no frequency that is closest to the origin, as the position (coordinates in the up-down direction) of the edge on the front surface side of the cargo W1 as viewed from the transport vehicle 1. Further, the edge specifying unit 35 specifies the upper section S4 with frequencies, which is adjacent to the area with no frequency that is second closest to the origin, as the position (coordinates in the up-down direction) of the edge on the front surface side of the frame.

Next, the distance calculation unit 36 calculates the distance D1 of the gap between the specified position of the edge of the cargo W1 and the specified position of the edge of the cargo W2 in the left-right direction by the same method as described above. Further, the distance calculation unit 36 calculates the distance D2 of the gap between the specified position of the edge of the frame and the specified position of the edge of the cargo W2 in the up-down direction.

Figure 8A:
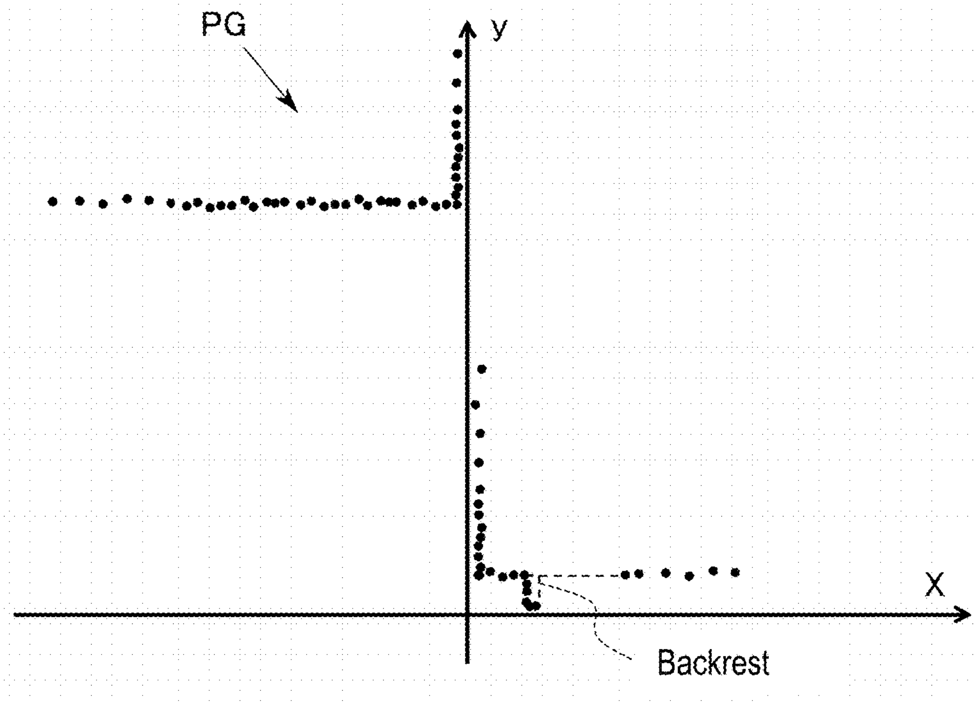
FIG. 8A is a diagram showing yet another point group acquired by the two-dimensional LiDAR sensor on the left side.
Figure 8C:
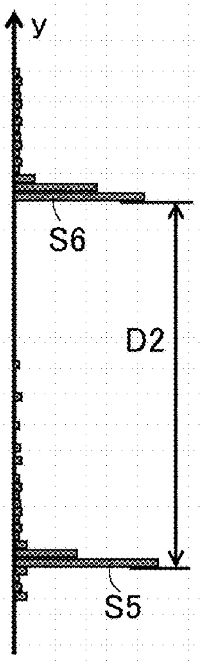
FIG. 8C is a diagram in which the point group of FIG. 8A is displayed as a histogram in the front-rear direction.
Figure 8B:
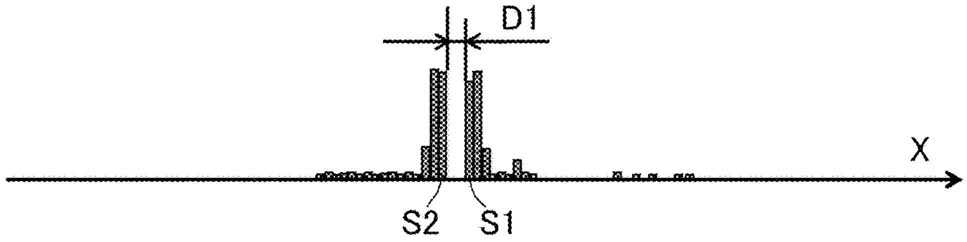
FIG. 8B is a diagram in which the point group of FIG. 8A is displayed as a histogram in the left-right direction.

In addition, FIG. 8A shows the point group PG acquired by the two-dimensional LiDAR sensor 22 when the position of the two-dimensional LiDAR sensor 22 is arranged at the center of the height of the backrest 18. The right side of FIG. 8A shows the point group PG acquired by reflection of the laser to the end portion of the backrest 18.

In this case, the edge specifying unit 35 specifies the lower section S5, among the sections of the peak values respectively in the upper section group and the lower section group, as the position of the edge on the front surface side of the cargo W1 as viewed from the transport vehicle 1, and specifies the upper section S6 as the position (coordinates in the up-down direction) of the edge on the front surface side of the cargo W2. The edge specifying unit 35 specifies the positions of the edges of the cargo W1 and the cargo W2 in the left-right direction by the same method.

Next, the distance calculation unit 36 calculates the distances D1 and D2 of the gaps by the same method.

Figure 9A:
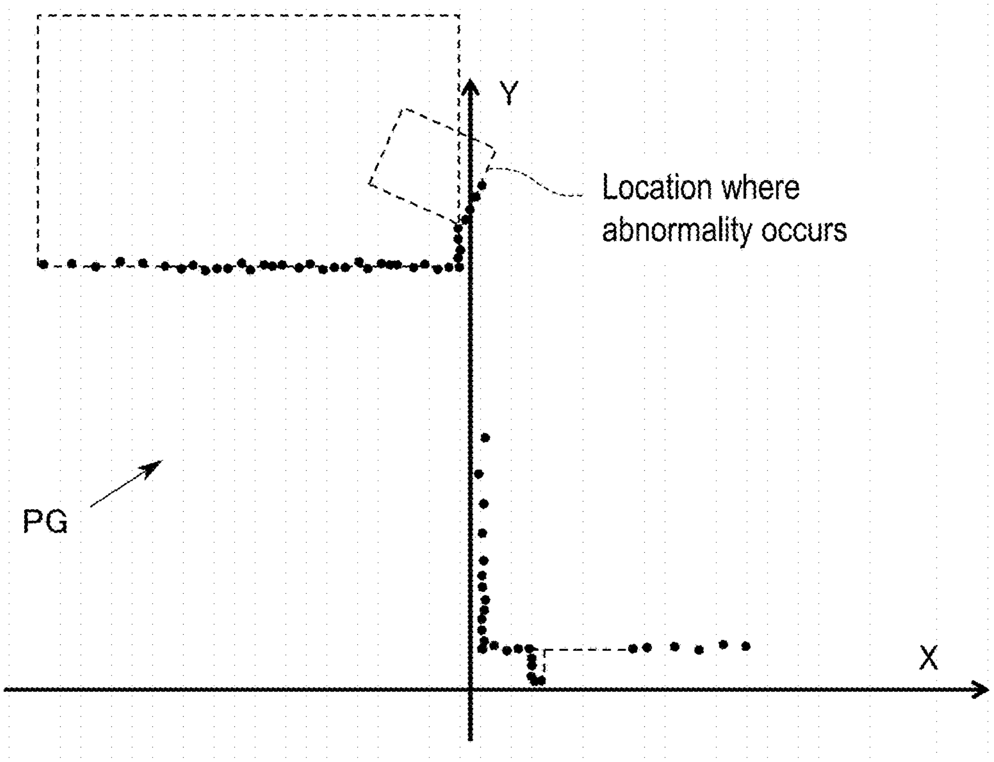
FIG. 9A is a diagram showing yet another point group acquired by the two-dimensional LiDAR sensor on the left side.
Figure 9C:
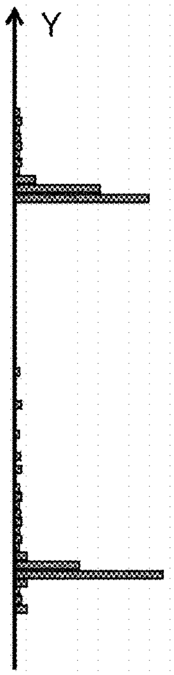
FIG. 9C is a diagram in which the point group of FIG. 9A is displayed as a histogram in the front-rear direction.

Further, FIG. 9A shows the point group PG acquired by the two-dimensional LiDAR sensor 22 when there is an abnormality in the loading destination space, such as collapse of cargo.

The upper side of FIG. 9A shows the point group PG acquired by reflection of the laser to the location where the abnormality occurs.

Figure 9B:
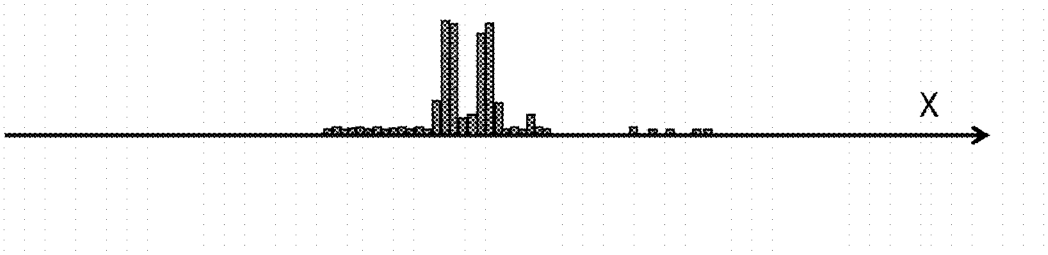
FIG. 9B is a diagram in which the point group of FIG. 9A is displayed as a histogram in the left-right direction.

In this case, as shown in FIG. 9B, there is no area with no frequency in the center in the left-right direction. Thus, the edge specifying unit 35 is not able to specify the edges of the cargo W1 and the cargo W2. In other words, the edge specifying unit 35 is able to specify that there is no gap between the cargo W1 and the cargo W2, which makes it possible to recognize that the cargo handling cannot be performed without interfering with other cargo, such as when there is an abnormality in the loading destination space. At this time, the controller 30 may stop the cargo handling operation of the transport vehicle 1.

It should be noted that there may be cases where there is no abnormality in the loading destination space. Thus, the side shift controller 40 may be configured to side-shift the cargo loading unit in the direction of the cargo loading position P from the object when there is no distance between the cargo W1 and the object (cargo W2) in the left-right direction. The case where there is no distance between the cargo W1 and the object (cargo W2) in the left-right direction is, for example, a case where the cargo W1 and the cargo W2 overlap in the left-right direction.

Figure 10A:
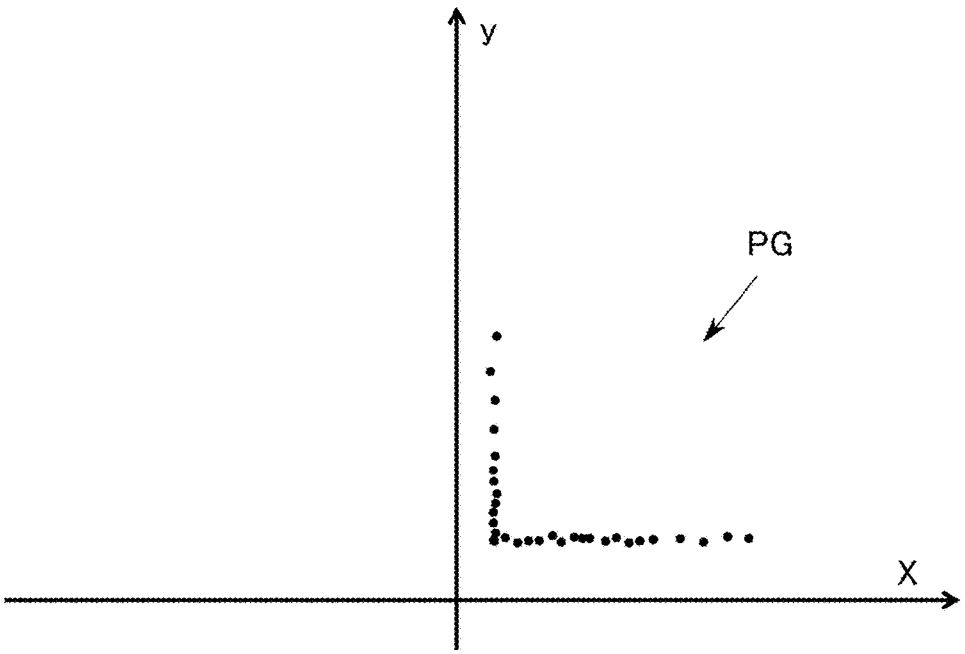
FIG. 10A is a diagram showing yet another point group acquired by the two-dimensional LiDAR sensor on the left side.

FIG. 10A shows the point group PG acquired by irradiating only the cargo W1 with a laser by the two-dimensional LiDAR sensor 22.

Figure 10C:
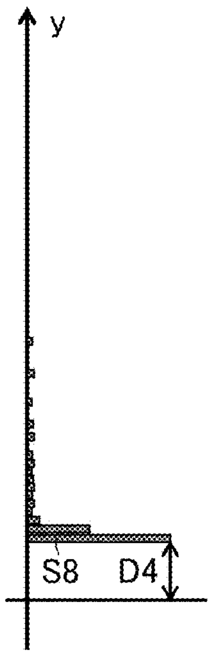
FIG. 10C is a diagram in which the point group of FIG. 10A is displayed as a histogram in the front-rear direction.
Figure 10B:
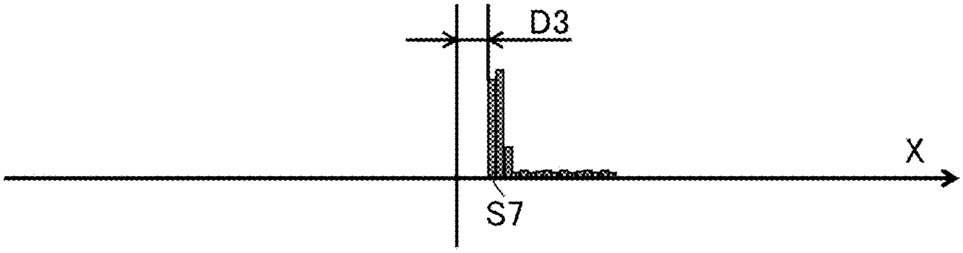
FIG. 10B is a diagram in which the point group of FIG. 10A is displayed as a histogram in the left-right direction.

As shown in FIG. 10B and FIG. 10C, the edge specifying unit 35 specifies the sections S7 and S8 with frequencies, which are closer to the origin, as the positions of the edges in the left-right direction and the up-down direction of the cargo W1.

Next, the distance calculation unit 36 calculates the distances D3 and D4 from the two-dimensional LiDAR sensor 22 (origin) to the specified positions of the edges on the left side and the front surface side of the cargo W1. Thereby, it is possible to acquire the positional relationship between the cargo W1 and the two-dimensional LiDAR sensor 22.

As briefly mentioned in the description of related art, in the analysis using a LiDAR sensor, conventionally the distance between a surrounding object and the LiDAR sensor is specified by comparing and matching the shape and features of the object that has been specified in advance with the acquired point group PG. For this method, it is difficult to stably acquire the distance to the surrounding object when the unloading destination is a thin frame-shaped structure, when the surrounding structure including the backrest 18 is detected by the LiDAR sensor, or when there is an abnormality in the loading destination space.

Besides, since the conventional analysis using a LiDAR sensor adopts a method of recognizing the shape and features of an object that has been specified in advance, the position of the LiDAR sensor is adjusted so as to irradiate the cargo W1 with a laser and not block the laser. Therefore, with the conventional method, it is not possible to acquire the mutual positional relationship among the transport vehicle 1, the cargo W1, and the object adjacent to the cargo loading position P by only the LiDAR sensor. Thus, for the conventional method, it is necessary to separately perform other distance measurement, interference confirmation, etc., and for these purposes, it is necessary to separately arrange other sensors.

In contrast, according to the method of the disclosure, it is possible to acquire the mutual positional relationship among the transport vehicle 1, the loaded cargo W1, and the object or cargo W2 adjacent to the cargo loading position P using only the left and right two-dimensional LiDAR sensors 22. Moreover, according to the method of the disclosure, it is possible to constantly and stably acquire the distance between the cargo W1 and the cargo W2 even when the unloading destination is a thin frame-shaped structure or when the surrounding structure including the backrest 18 is detected by the two-dimensional LiDAR sensor 22. Furthermore, according to the method of the disclosure, it is also possible to immediately stop the cargo handling work when there is an abnormality in the loading destination space.

Next, an example of a series of operations of the transport vehicle 1 according to the disclosure will be described with reference to FIG. 11A to FIG. 12C. In this description, the transport vehicle 1 in FIG. 11A to FIG. 12C is assumed to be a counter-type forklift. Thus, it is assumed that the position of the mast 14 in the front-rear direction does not move.

Figure 11A:
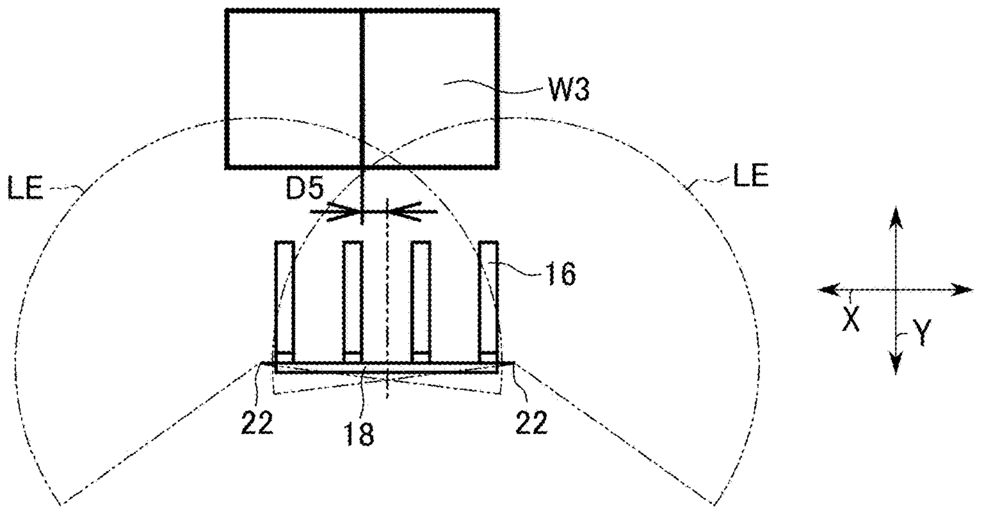
FIG. 11A, FIG. 11B, and FIG. 11C are views respectively showing a series of operations of the transport vehicle.

(1) (1-1) As shown in FIG. 11A, before the transport vehicle 1 scoops up the cargo W3, the left and right two-dimensional LiDAR sensors 22 irradiate the cargo W3 with lasers.

(1-2) Next, the transport vehicle 1 analyzes the acquired point group PG by the edge specifying unit 35 using the frequency distribution to specify the edge positions of the left and right ends of the cargo W3.

(1-3) Next, the transport vehicle 1 calculates the position of the center of the cargo W3 in the left-right direction by the cargo position specifying unit 37, and calculates the distance D5 between the position of the center of the cargo W3 in the left-right direction and the position of the center of the backrest 18 in the left-right direction by the distance calculation unit 36.

(1-4) Furthermore, based on the calculated distance D5, the transport vehicle 1 moves the forks 16 in the left-right direction by the side shift unit 19, thereby correcting the center deviation between the forks 16 and the cargo W3.

For example, when the transport vehicle 1 is a side fork vehicle, the transport vehicle 1 is capable of correcting the center deviation between the forks 16 and the cargo W3 by moving the vehicle body 11 by the travel controller 34 based on the specified distance D5.

Figure 11B:
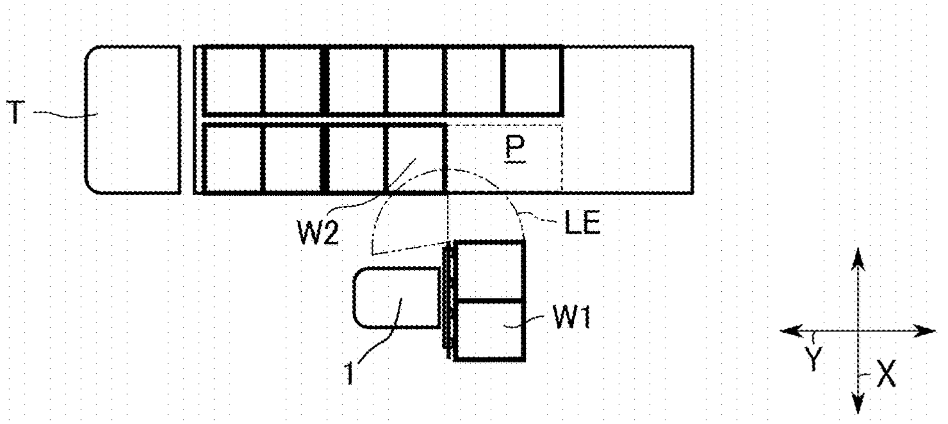

(2) (2-1) Next, the transport vehicle 1 scoops up the cargo W3 (W1) and transports it to the truck T, and as shown in FIG. 11B, travels in parallel to the loading platform of the truck T while irradiating the loading platform of the truck T with a laser by the two-dimensional LiDAR sensor 22 on the side of the truck T.

(2-2) Next, the transport vehicle 1 analyzes the acquired point group PG by the edge specifying unit 35 using the frequency distribution to specify the position of the edge of the object (cargo W2) adjacent to the cargo loading position P on the loading platform, and calculate the mutual distances (positional relationship) among the specified position of the edge, the position of the two-dimensional LiDAR sensor 22, and the position of the cargo W1 by the distance calculation unit 36.

(2-3) Next, when specifying the position of the edge of this object, the transport vehicle 1 changes the direction to the side of the truck T by the travel controller 34 based on the positional relationship among the specified position of the edge, the position of the two-dimensional LiDAR sensor 22, and the cargo W1.

Figure 11C:
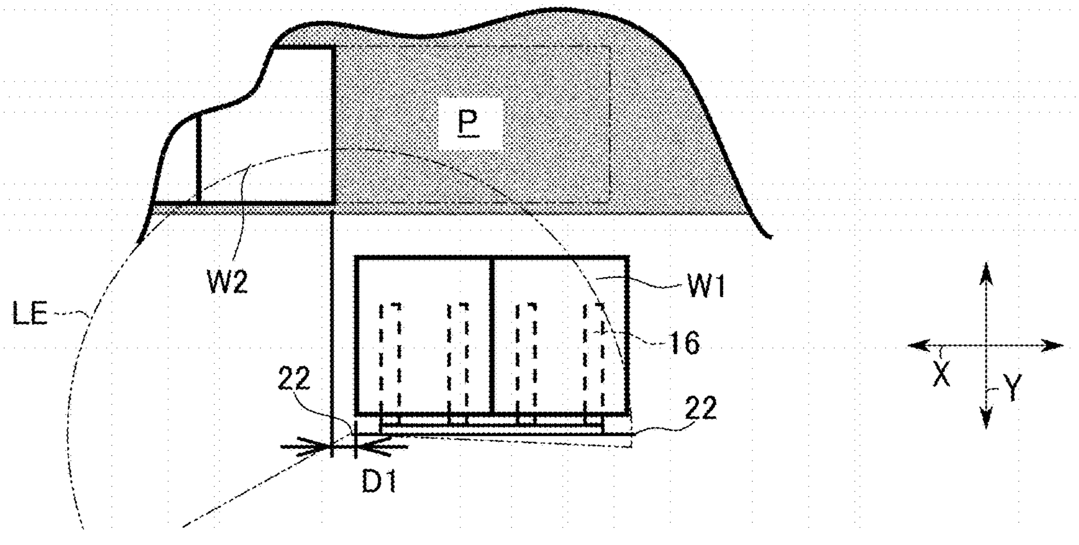

(3)(3-1) Next, as shown in FIG. 11C, before the transport vehicle 1 advances toward the cargo loading position P, the two-dimensional LiDAR sensor 22 irradiates a laser in the horizontal direction.

(3-2) Next, the transport vehicle 1 analyzes the acquired point group PG by the edge specifying unit 35 using the frequency distribution to specify the positions of the edges of the cargo W1 and the cargo W2.

(3-3) Next, the transport vehicle 1 calculates the distance D1 between the cargo W1 and the cargo W2 by the distance calculation unit 36 to determine whether the cargo W1 interferes with the cargo W2. At this time, as described above, the transport vehicle 1 may stop cargo handling when specifying that an abnormality has occurred.

(4)(4-1) Next, the transport vehicle 1 advances to the cargo loading position P by the travel controller 34 based on the distance D2 in the front-rear direction between the cargo W1 and the cargo W2 calculated by the distance calculation unit 36.

Figure 12A:
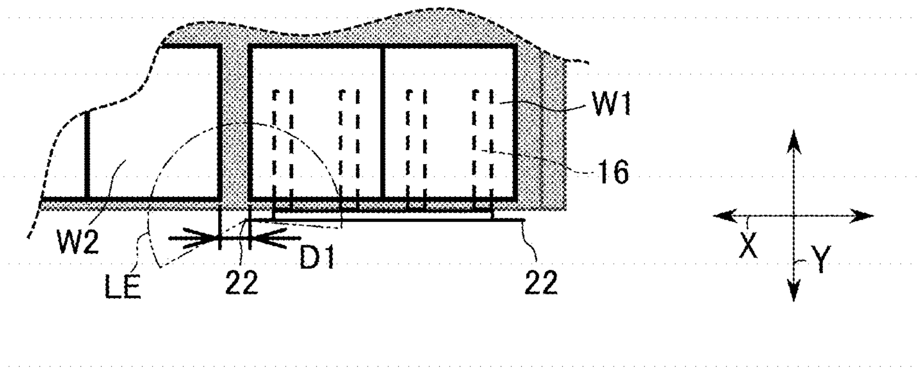
FIG. 12A, FIG. 12B, and FIG. 12C are views respectively further showing a series of operations of the transport vehicle.

(4-2) Next, as shown in FIG. 12A, the transport vehicle 1 irradiates a laser in the horizontal direction by the two-dimensional LiDAR sensor 22 before unloading the cargo W1.

(4-3) Next, the transport vehicle 1 specifies the edges of the cargo W1 and the cargo W2 by analyzing the acquired point group PG by the edge specifying unit 35 using the frequency distribution.

(4-4) Next, the transport vehicle 1 calculates the distance D1 between the cargo W1 and the cargo W2 by the distance calculation unit 36.

(4-5) Next, the transport vehicle 1 determines an appropriate side shift amount by the side shift controller 40 based on the calculated distance D1.

In this way, the transport vehicle 1 is able to appropriately bring the cargo W1 close to the cargo W2 by the side shift unit 19.

Figure 12B:
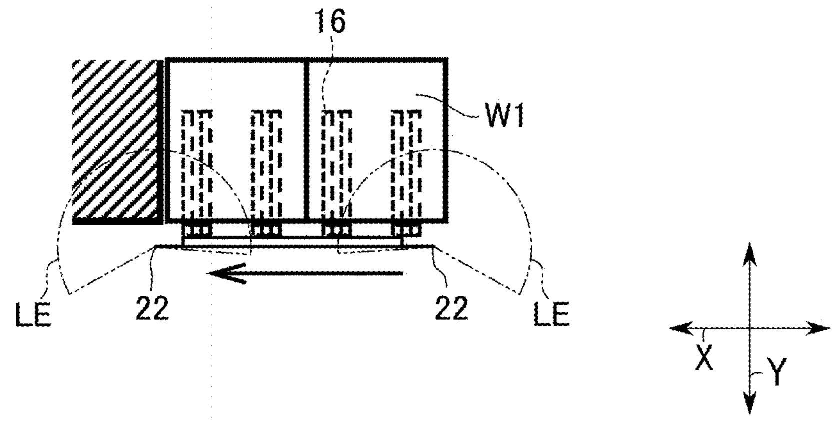

(5)(5-1) Next, as shown in FIG. 12B, the transport vehicle 1 irradiates a laser with the two-dimensional LiDAR sensor 22 when moving the forks 16 to the left by the side shift unit 19.

(5-2) Next, the transport vehicle 1 moves the forks 16 by the side shift unit 19 while specifying the edge of the cargo W1 by the edge specifying unit 35 and specifying the positional relationship between the two-dimensional LiDAR sensor 22 and the cargo W1 by the cargo position specifying unit 37.

(5-3) At this time, when detecting a change in the positional relationship between the two-dimensional LiDAR sensor 22 and the cargo W1 by the cargo position specifying unit 37, the transport vehicle 1 stops the operation of the side shift unit 19 by the side shift stop unit 41.

Thereby, the transport vehicle 1 is able to detect that the cargo W1 starts to slide on the forks 16. Thus, for example, the transport vehicle 1 is able to detect that the cargo W1 is pressed against an object such as the front panel or the rear panel of the truck T, and stop the movement of the forks 16 after this detection to prevent damage to the front panel and the rear panel.

On the other hand, if it is desired to press the cargo W1 against the cargo W2, the transport vehicle 1 may side-shift the cargo loading unit by the side shift unit 19 until the side shift controller 40 detects that the cargo W1 starts to slide on the forks 16.

Figure 12C:
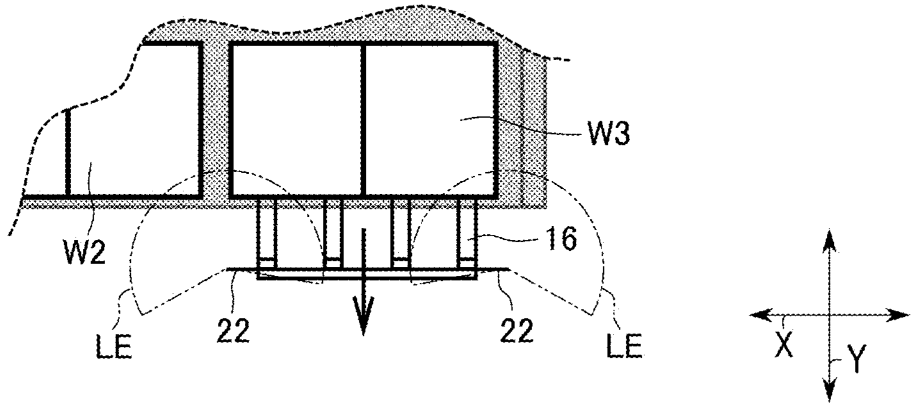

(6)(6-1) Next, as shown in FIG. 12C, the transport vehicle 1 irradiates a laser by the two-dimensional LiDAR sensor 22 when pulling out the forks 16 from the cargo W3.

(6-2) Next, the transport vehicle 1 analyzes the acquired point group PG by the edge specifying unit 35 using the frequency distribution to pull out the forks 16 while specifying the edge of the cargo W3 and specifying the positional relationship between the two-dimensional LiDAR sensor 22 and the cargo W3 by the cargo position specifying unit 37.

(6-3) At this time, the transport vehicle 1 stops the movement of the transport vehicle 1 by the travel controller 34 when the cargo position specifying unit 37 detects that there is no change in the positional relationship between the two-dimensional LiDAR sensor 22 and the cargo W3.

Thereby, the transport vehicle 1 prevents the cargo W3 from being dragged by the forks 16.

As described above, the two-dimensional LiDAR sensor 22 is arranged at a position to be capable of irradiating the cargo W1 and the cargo loading position P with a laser, making it possible to irradiate the cargo W1 and the object (for example, cargo W2) adjacent to the cargo loading position P with a laser and detect the reflected light from the cargo W1 and the object adjacent to the cargo loading position P to acquire the point group PG. Thus, the transport vehicle 1 is capable of specifying the positions of the edges of the cargo W1 and the cargo W2 by the edge specifying unit 35 and calculating the distances D1 and D2 by the distance calculation unit 36, so it is possible to correct the cargo loading position P afterward and appropriately perform cargo handling work even if the mobile shelf, the truck T, or the like deviates from the predetermined position.

Moreover, since the transport vehicle 1 detects whether the positional relationship of the cargo W1 with respect to the forks 16 changes by the cargo position specifying unit 37, it is possible to detect that the cargo W1 has come into contact with the surrounding object.

In addition, since the transport vehicle 1 is capable of specifying three relative positional relationships among the cargo W1, the cargo W2, and the two-dimensional LiDAR sensor 22 (transport vehicle 1) by analyzing the point group PG using the frequency distribution, the transport vehicle 1 is capable of performing the series of operations (1) to (6) described above.

Although an embodiment of the transport vehicle and the cargo handling program according to the disclosure has been described above, the disclosure is not limited to the above embodiment. For example, the transport vehicle according to the disclosure may be implemented according to the following modified examples.

MODIFIED EXAMPLE

The second end portion 23*c* of the connecting part 23 is not necessarily positioned above the backrest 18. In this case, the point group PG acquired by the two-dimensional LiDAR sensor 22 becomes the point group PG shown in FIG. 8A, and as already described, the edge specifying unit 35 is capable of specifying the positions of the edges of the cargo W1 and the cargo W2, and the distance calculation unit 36 is capable of calculating the distance between the cargo W1 and the cargo W2. Further, the first end portion 23*a* of the connecting part 23 may be provided at the upper end of the backrest 18.

The two-dimensional LiDAR sensor 22 may be fixed to the vehicle body 11 and the finger bar, for example, as long as the two-dimensional LiDAR sensor 22 is arranged at a position to be capable of irradiating the cargo W1 loaded on the cargo loading unit 16 and the object adjacent to the cargo loading position P with a laser, or the first end portion 23*a* of the connecting part 23 may be fixed to the side surface (see FIG. 1) of a vertical unit 16*a* of the fork 16, which extends in the up-down direction. Alternatively, the two-dimensional LiDAR sensor 22 may be fixed to the vehicle body 11, the vertical unit 16*a* of the fork 16, and the finger bar via the connecting part.

The cargo loading unit may be configured by a platen instead of the fork 16, for example.

What is claimed is:

1. A transport vehicle, comprising:
- a cargo loading unit;
- a side shift unit comprising an actuator that side-shifts the cargo loading unit;
- a point group acquisition unit comprising a laser that acquires a point group by horizontally irradiating cargo loaded on the cargo loading unit; and
- a processor, configured to:
- while the cargo loading unit is side-shifting, control the point group acquisition unit to irradiates the laser;
- analyze the acquired point group using a frequency distribution to specify a position of an edge of the cargo;
- control a side shift amount of the side shift unit;
- detect whether a positional relationship of the cargo with respect to the cargo loading unit changes based on the specified position of the edge of the cargo when the cargo loading unit is side-shifting; and
- in response that the positional relationship of the cargo with respect to the cargo loading unit changes, stop an operation of the side shift unit.

2. The transport vehicle according to claim 1, wherein the processor side-shifts the cargo loading unit by the side shift unit until detecting that the positional relationship of the cargo with respect to the cargo loading unit changes during cargo loading.

3. The transport vehicle according to claim 1,
- wherein the point group acquisition unit is arranged at a position to be capable of irradiating an object adjacent to a cargo loading position with the laser,
- wherein the processor is further configured to:
  - specify an edge of the object based on the acquired point group; and
  - calculate a distance in a left-right direction between the cargo and the object based on the specified positions of the edges of the cargo and the object, and
- wherein the processor determines the side shift amount based on the calculated distance in the left-right direction between the cargo and the object.

4. The transport vehicle according to claim 3, wherein processor analyzes the acquired point group using a frequency distribution with the distance in the left-right direction as an axis, and specifies a section with frequencies, adjacent to an area with substantially no frequency, as the position of the edge of the cargo in the left-right direction.

5. The transport vehicle according to claim 4, wherein the processor analyzes the acquired point group using the frequency distribution with a distance in a front-rear direction as an axis, and specifies a section of a peak value in an upper area as the edge of the object and specifies a section of a peak value in a lower area as the position of the edge of the cargo.

6. The transport vehicle according to claim 3, wherein the processor side-shifts the cargo loading unit from the object in a direction of the cargo loading position when there is no distance in the left-right direction between the cargo and the object.

7. The transport vehicle according to claim 1, wherein the point group acquisition unit is arranged at a position to be capable of irradiating the cargo loaded on the cargo loading unit and a cargo loading position with the laser.

8. The transport vehicle according to claim 1, wherein the transport vehicle is a forklift and comprises a backrest, and
- the point group acquisition unit is provided in the backrest.

9. A non-transitory computer-readable recording medium, recording a cargo handling program, causing a computer to operate as the processor according to claim 1.

10. The transport vehicle according to claim 1,
- wherein the point group is acquired from a single two-dimensional laser.

11. The transport vehicle according to claim 10,
- wherein the processor detects whether the positional relationship of the cargo with respect to the cargo loading unit changes based on a positional relationship of the cargo with respect to the single two-dimensional laser.

12. The transport vehicle according to claim 10,
- wherein the processor detects whether the positional relationship of the cargo with respect to the cargo loading unit changes when the cargo loading unit is being pulled out from the cargo.

* * * * *